United States Patent
Kelleher et al.

(10) Patent No.: US 11,928,116 B2
(45) Date of Patent: Mar. 12, 2024

(54) BOOSTING NEWS IN ORGANIZATION COMMUNICATIONS

(71) Applicant: Microsoft Technology Licensing, LLC, Redmond, WA (US)

(72) Inventors: Patrick James Kelleher, Seattle, WA (US); Brian Arthur Vannoy, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/354,538

(22) Filed: Jun. 22, 2021

(65) Prior Publication Data

US 2022/0405291 A1    Dec. 22, 2022

(51) Int. Cl.
*G06F 3/048*        (2013.01)
*G06F 3/0481*       (2022.01)
*G06F 3/04847*      (2022.01)
*G06F 16/2457*      (2019.01)

(52) U.S. Cl.
CPC ...... *G06F 16/24578* (2019.01); *G06F 3/0481* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 6,745,193 B1 * | 6/2004 | Horvitz | H04L 67/52 707/999.102 |
| 7,349,921 B2 | 3/2008 | Hirstius et al. | |
| 7,716,223 B2 * | 5/2010 | Haveliwala | G06F 16/9535 707/738 |
| 7,941,491 B2 | 5/2011 | Sood | |
| 8,255,521 B1 | 8/2012 | Natarajan et al. | |
| 8,386,601 B1 * | 2/2013 | Sutter | H04N 21/2402 709/224 |
| 10,356,168 B1 * | 7/2019 | Shivaswamy | H04L 67/10 |

(Continued)

FOREIGN PATENT DOCUMENTS

| | | |
|---|---|---|
| CN | 104715375 A | 6/2015 |
| WO | 2018023637 A1 | 2/2018 |

OTHER PUBLICATIONS

William Herkewitz, "Upvotes, Downvotes, and the Science of the Reddit Hivemind", Published: Aug. 8, 2013, https://www.popularmechanics.com/science/health/a9335/upvotes-downvotes-and-the-science-of-the-reddit-hivemind-15784871/ (Year: 2013).*

(Continued)

*Primary Examiner* — Hua Lu
(74) *Attorney, Agent, or Firm* — NovoTechIP International PLLC

(57) ABSTRACT

A system and method for boosting items or news posts in a news feed on an organization news site. A boost module allows an organization communicator or administrator to set boost parameters for a selected news post. The boost parameters may include boosting a news post until it is viewed, boosting for a number of impressions, boosting until a particular date, and setting a rank for the news post relative to other boosted items. Boosting a news post may be done when the news post is created and published or after it has been published. Boosted items or news posts may include an icon or symbol to indicate the item is boosted in the user's newsfeed.

18 Claims, 11 Drawing Sheets

(56) References Cited

U.S. PATENT DOCUMENTS

| | | | |
|---|---|---|---|
| 10,382,629 B2 | 8/2019 | Mccoy | |
| 10,708,211 B2* | 7/2020 | Penilla | H04L 51/42 |
| 11,171,908 B1* | 11/2021 | Barton | G06F 11/3006 |
| 11,188,215 B1* | 11/2021 | Holland | H04L 67/306 |
| 2004/0210932 A1* | 10/2004 | Mori | H04N 21/47214 |
| | | | 725/39 |
| 2005/0165743 A1* | 7/2005 | Bharat | G06F 16/9538 |
| 2006/0010217 A1* | 1/2006 | Sood | H04L 51/212 |
| | | | 709/206 |
| 2012/0078917 A1* | 3/2012 | Gradin | G06F 16/23 |
| | | | 707/E17.084 |
| 2012/0223951 A1* | 9/2012 | Dunn | H04L 51/52 |
| | | | 345/467 |
| 2013/0024788 A1* | 1/2013 | Olsen | G06Q 10/10 |
| | | | 715/753 |
| 2013/0073502 A1* | 3/2013 | Golan | G06Q 30/02 |
| | | | 706/45 |
| 2013/0091229 A1* | 4/2013 | Dunn | G06Q 50/01 |
| | | | 709/206 |
| 2013/0198652 A1* | 8/2013 | Dunn | G06Q 50/01 |
| | | | 715/751 |
| 2013/0232156 A1* | 9/2013 | Dunn | G06F 16/957 |
| | | | 707/752 |
| 2013/0238706 A1* | 9/2013 | Desai | H04W 4/029 |
| | | | 709/204 |
| 2014/0052540 A1* | 2/2014 | Rajaram | G06Q 30/0269 |
| | | | 705/14.66 |
| 2014/0067814 A1* | 3/2014 | Palmert | G06F 16/9536 |
| | | | 707/738 |
| 2014/0101247 A1* | 4/2014 | Pappas | H04L 67/535 |
| | | | 709/204 |
| 2014/0201204 A1* | 7/2014 | Bharat | G06F 16/23 |
| | | | 707/732 |
| 2015/0269209 A1* | 9/2015 | Kemp | G06F 16/2379 |
| | | | 705/319 |
| 2015/0331901 A1* | 11/2015 | Olsen | G06Q 10/107 |
| | | | 707/738 |
| 2015/0347543 A1* | 12/2015 | Sinha | G06F 16/9535 |
| | | | 707/707 |
| 2016/0070705 A1* | 3/2016 | Chevalier | G06F 16/24578 |
| | | | 707/728 |
| 2016/0105527 A1* | 4/2016 | Dunn | H04L 67/306 |
| | | | 709/204 |
| 2016/0105540 A1* | 4/2016 | Kwon | H04N 21/4312 |
| | | | 715/744 |
| 2016/0371272 A1* | 12/2016 | Grainger | H04L 51/18 |
| 2018/0165692 A1 | 6/2018 | Mccoy | |
| 2018/0293278 A1* | 10/2018 | Kapoor | G06F 40/30 |
| 2018/0336501 A1* | 11/2018 | Le | G06Q 50/01 |
| 2019/0034431 A1* | 1/2019 | Gordon | G06F 16/9535 |
| 2019/0362409 A1* | 11/2019 | Srinivasan | G06Q 30/0201 |
| 2021/0035180 A1* | 2/2021 | Chakraborty | G06F 16/24578 |

OTHER PUBLICATIONS

Howfinity, "How to Use Reddit—Complete Beginner's Guide", Published: 2020, https://www.youtube.com/watch?v=CUMaeH63suU (Year: 2020).*

"SnapComms Features Overview", Retrieved from: http://web.archive.org/web/20210119001209/https://www.snapcomms.com/product-features, Jan. 19, 2021, 3 Pages.

Constine, Josh, "Pay To "Highlight" Your Facebook Status Updates To More Friends—A Privileged and Confidential 7 HB/VT/AS Reckless New Ads Test", Retrieved from: https://techcrunch.com/2012/05/10/highlight-facebook-status-updates/?_ga=2.49845030.1035965031.1616467063-443208167.1615138900, May 11, 2012, 5 Pages.

Holme, Dan, "Innovations for Workplace Communications and Employee Engagement in Microsoft 365", Retrieved from: https://techcommunity.microsoft.com/t5/microsoft-sharepoint-blog/innovations-for-workplace-communications-and-employee-engagement/ba-p/1696149, Sep. 22, 2020, 26 Pages.

Shumate, et al., "Create an organization news site", Retrieved from: https://docs.microsoft.com/en-us/sharepoint/organization-news-site, Mar. 10, 2021, 5 Pages.

* cited by examiner

BOOSTING NEWS IN ORGANIZATION COMMUNICATIONS

TECHNICAL FIELD

The disclosure relates generally to computer software that provides communication within an organization and, more particularly, to a system and method for boosting items or news posts in a news feed of an organization news site.

BACKGROUND

Many organizations such as corporations, non-profits, schools and government entities utilize an organization news site to communicate information among members of the organization. Organization news sites typically operate as a communications portal on an organization intranet accessible only to members of the organization. The organization news site may be a private news server that is accessed by a generic browser or a specific program utilized by the organization to access the server that hosts the organization news site. The organization news site may allow all members of the organization create news content that is posted. The organization news site typically displays news items or posts based on the priority the posts were created by organization content creators. The organization news site may allow organization communicators or administrators to "pin" a news item to the top of the news feed.

SUMMARY

A system and method for boosting items or news posts in a news feed of an organization news site is described. A boost module allows an organization communicator or administrator to set boost parameters for a selected news post. The boost parameters may include boosting a news post until it is viewed, boosting for a number of impressions, boosting until a particular date, and setting a rank for the news post relative to other boosted items. Boosting a news post may be done when the news post is created and published or after it has been published. Boosted items or news posts may include an icon or symbol to indicate the item is boosted in the user's newsfeed.

A device for boosting news posts in an organization news site includes: a processor; and a memory in communication with the processor, the memory comprising executable instructions that, when executed by the processor, cause the processor to control the device to perform functions of: displaying a news post of an organization news site on a graphical user interface for a user; providing a boost parameter input on the graphical user interface that allows the user to set at least one boost parameter, where the at least one boost parameter sets a display priority for the news post relative to other news posts of an organization news site; and displaying the news post in a news feed of an organization member with the rank of the news post in the news feed determined by the at least one boost parameters set by the user.

In another implementation, a method of operating a device includes: providing a graphical user interface for a user on a display; displaying a news post of an organization news site on a graphical user interface for a user; providing a boost parameter input on the graphical user interface that allows the user to set at least one boost parameter, where the at least one boost parameter sets a display priority for the news post relative to other news posts of an organization news site; and displaying the news post in a news feed of an organization member with the rank of the news post in the news feed determined by the at least one boost parameters set by the user.

In another implementation, a method of operating a device includes: providing a graphical user interface for a user on a display; displaying a news post of an organization news site on a graphical user interface for a user; providing a boost selection for promoting news posts on the graphical user interface; in response to the user selecting the boost selection for the news post, providing a boost parameter input on the graphical user interface that allows the user to set a plurality of boost parameters, where the plurality of boost parameters set a display priority for the news post relative to other news posts of an organization news site; creating and storing a boost configuration for the boosted news post which includes parameters for boosting the news post on a per organization member basis; and displaying the news post in a news feed of an organization member with the rank of the news post in the news feed determined by the at least one boost parameter among the boost parameters set by the user; wherein the plurality of boost parameters includes boosting the news post in the organization member's news feed for a number of impressions of the organization member on a per organization member basis; wherein the news post displayed in the news feed of the organization member includes an indication that the news post was boosted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to a system and method for boosting items or news posts on an organization news site. The system and method described overcome the technical problems associated with displaying news feed items to users of an organization news site in a fixed manner. Organization communicators may desire to set criteria for specific news items to achieve better communication in the organization to individual members of the organization. The described boost module provides a technical solution by providing a set of boost parameters for each news post that is used to rank news posts in a member's news feed on a per member basis. The boost module allows an organization communicator or administrator to set one or more boost parameters for a selected news item. The boost parameters may include boosting until a news post is viewed, boosting for a number of impressions, boosting until a particular date, and setting a rank for the news post relative to other boosted items. Boosting a news post is typically done after a news post has been published and the effects of boosting the news post takes place immediately. Boosted news items or news posts may include an icon or symbol to indicate the item has been boosted in the user's newsfeed.

Figure 1:
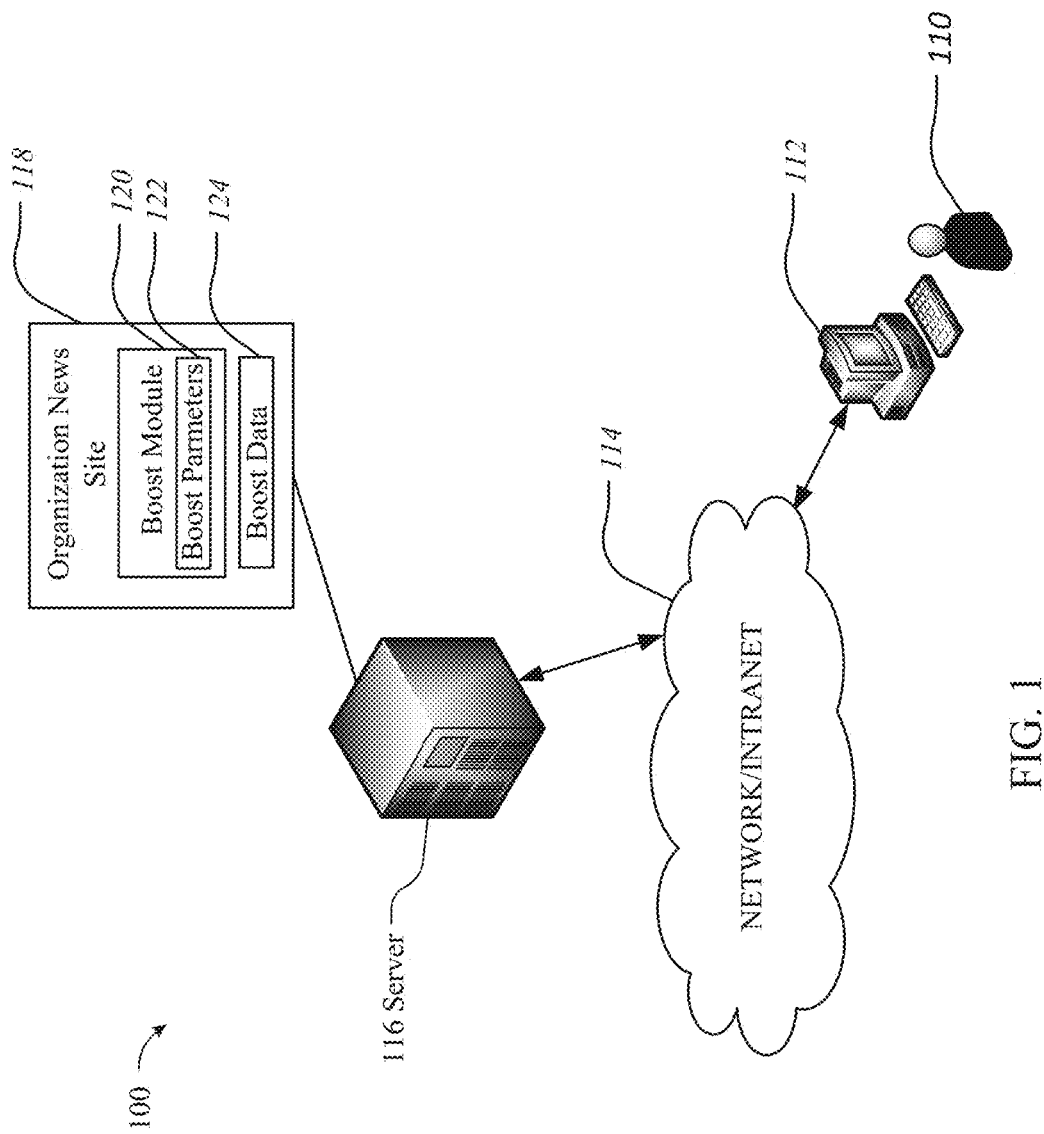
FIG. 1 illustrates a system which provides an organization news site to a user with a boost module boosts priority of news posts in a news feed as described herein.

FIG. 1 illustrates an exemplary organization news communication system 100 as described herein. The news organization system 100 provides a user interface (not shown) for a user 110 on a computer 112 to access a server 116 over a network 114. In the examples described herein, the user 110 is an organization communicator or an administrator that has the responsibility of managing content on the organization's news site. Alternatively, the user 110 is a member of the organization viewing the organizations news feed as described herein. The network 114 is typically an organization's intranet that may be accessed by the user 110 locally at the organization or over the internet. The server 116 may be a cloud-based server or an on-site server owned or maintained by the organization. The server 116 includes software that supports an organization news site 118. The organization news site 118 may be part of a larger software suite that provides a platform for shared access, interaction and collaboration for members of the organization. An example of such a platform is SharePoint Server™ 2019 by Microsoft Corporation.

Still referring to FIG. 1, the organization news site 118 includes a boost module 120 that allows a corporate communicator or administrator to set boost parameters 122 for each news item that is used to rank news items is a user's news feed to uniquely rank the news item for each member of the organization as described herein. The boost parameters 122 may be stored in the boost module 120, in the news organization site 118 or in any other memory storage location accessible to the boost module 120. Further, boost data 124 may also be stored in the organization news site 118. The boost data 124 may include data needed by the boost module. For example, the boost data may include the number of impressions for each news post for each member of the organization, and whether each news post has been viewed by each member of the organization as described below.

Figure 2A:
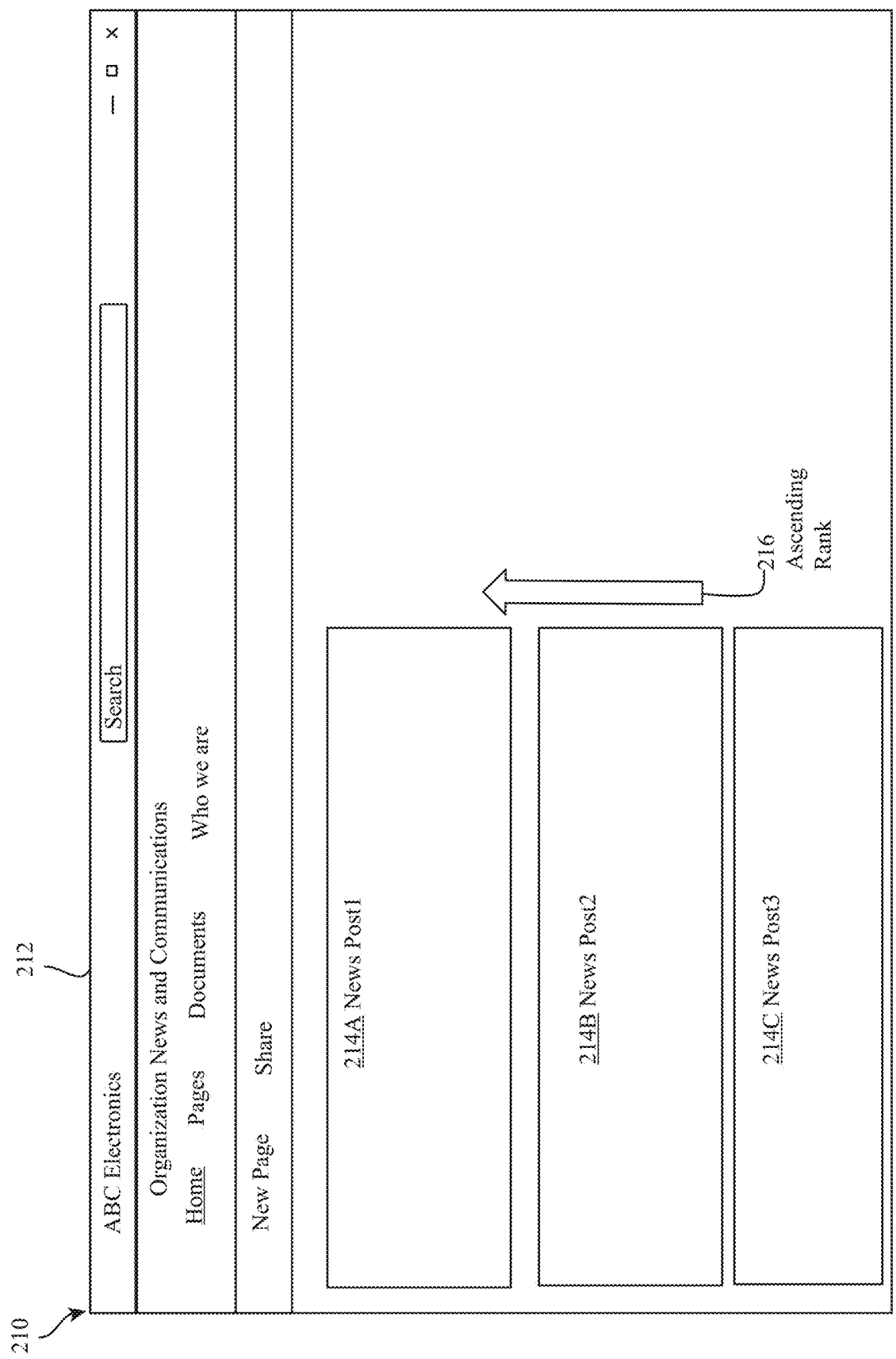
FIG. 2A illustrates an example of a user interface providing access to an organization news site with a boost module which boosts priority of news posts in a news feed.

FIG. 2A illustrates an example of a user interface 210 which supports a user accessing the organization news site 118 shown in FIG. 1. The user interface 210 may be provided by a browser or a custom computer interface executing on the user's computer to access the organization news site 118. In the illustrated example shown in FIG. 2, the user interface 210 is represented as a typical internet browser 212. The user interface 210 as shown in FIG. 2 represents a news feed page for an organization news site for a fictitious organization represented as "ABC Electronics". This page provides organization news and communications to members of the organization. The user interface 210 is shown displaying three news posts, News Post1 214A, News Post2 214B and News Post3 214C, collectively referred to as news posts 214. The news posts 214 may be any type of news item or communication from organization communicators posted by an individual within the organization. Examples of news posts 214 are described further below. The news posts 214 are typically displayed in an orderly manner with a display rank. In this example, the news posts 214 are displayed in a vertical order with an ascending rank 216 with the highest rank at the top, namely News Post1 214A.

Figure 2B:
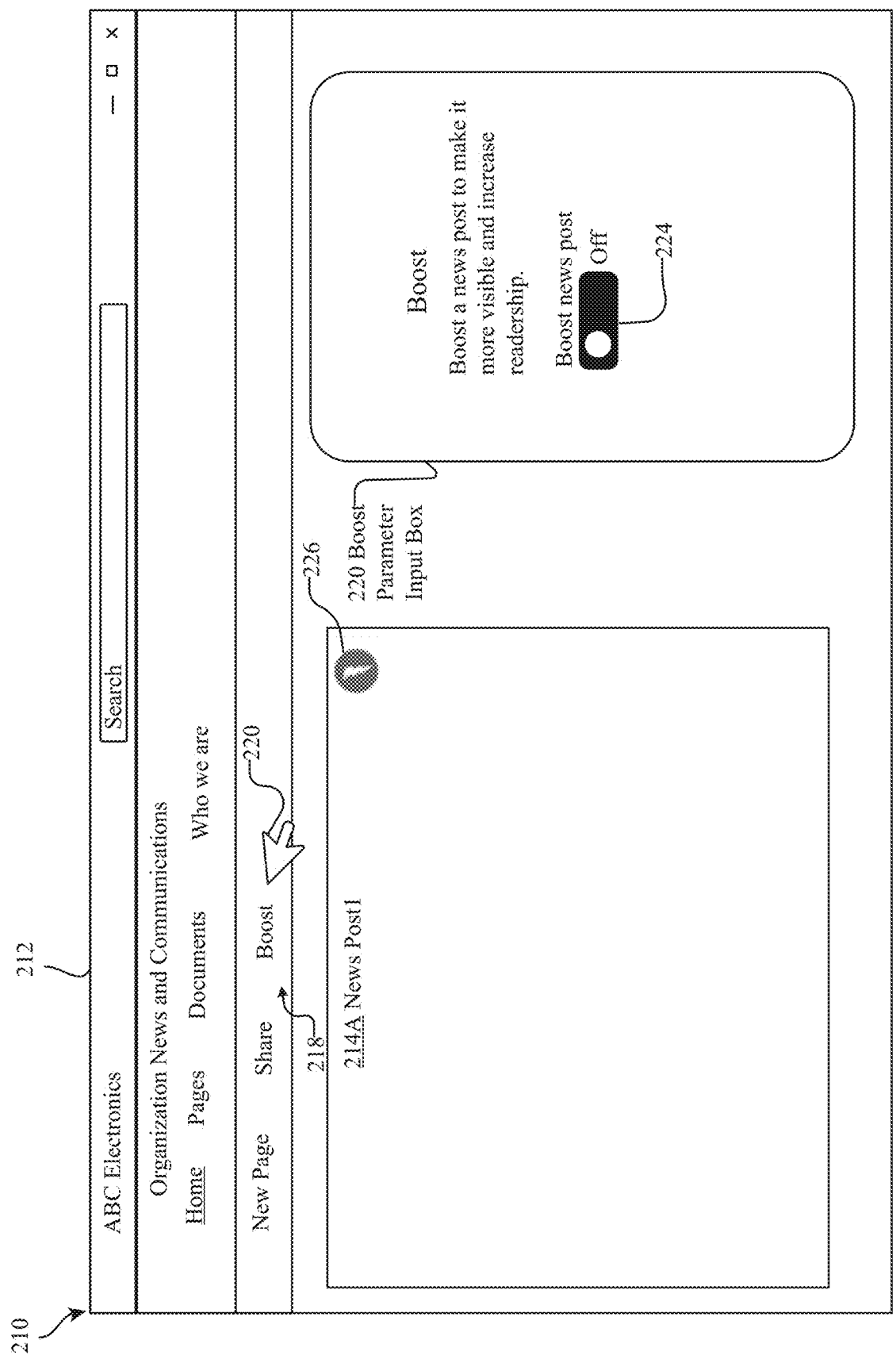
FIG. 2B illustrates another example of a user interface providing access to an organization news site with a boost module which boosts priority of news posts in a news feed.

FIG. 2B illustrates the user interface 210 of FIG. 2A after a user has selected news post1 214A. When a news post has been selected, the user interface 210 shows the selected news post opened, showing the full content of the news post. The other, non-selected news posts may be removed from view as shown in FIG. 2B. When a news post is opened, the user interface provides a boost selection button 218 that allows the user to boost the selected news post as described herein. In this example, when the boost selection button 218 is activated by a user, the organization news site responds by activating the boost module 120 shown in FIG. 1. The user may activate the boost button 218 in any suitable manner as known or developed in the future. For example, the user may activate the boost button by hovering a cursor 220 over the boost button 218 and pressing a mouse key (not shown). When the user activates the boost button 218, the boost module 120 allows the user to set boost criteria for each news item that is used to rank news items is a member's news feed. In this example, the boost module 120 displays a boost parameter input box 220 which allows the user to set boost parameters as described herein. The boost parameter input box 220 may include a boost on/off button 224 which turns on and off boosting for a selected news item. The boost on/off button 224 is shown in the "off" position in FIG. 2. Further, after a news post is boosted as described below, the news post may be given a boost indicator 226 to alert the user that the news post is boosted. In the example illustrated in FIG. 2, the boost indicator 226 is a circular icon which includes a graphical representation of a lightning bolt inside the circular icon.

In some implementations, the boost button 218 is displayed after a news post has been selected and opened as shown in FIG. 2B. Alternatively, a news item may be selected for boosting after activating the boost dialog box 220. The news item to be boosted may be indicated by highlighting the selected news post 214 or displaying the fully opened news post.

FIGS. 3A through 3D represent examples for prompting a user to set boost parameters for a news post. The represented examples may be implemented as part of user interface 210 as provided by the boost module 120 shown in the FIG. 1. Further, FIGS. 3A through 3D represent examples of prompting a user to set boost parameters using the boost dialog box 220 introduced in FIG. 2 after a user has selected to turn on boosting by activating the on/off button 224.

Figure 3A:
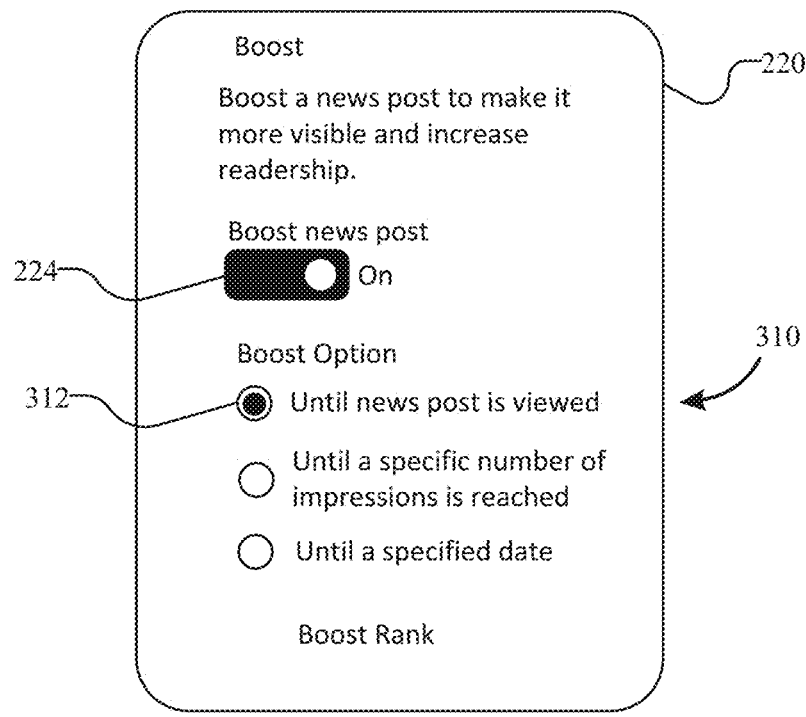
FIG. 3A illustrates an example boost dialog box which allows a user to set a boost parameter as described herein.

FIG. 3A represents a first example of prompting a user to set a boost parameter for a news post. After a user has selected to turn on boosting by activating the on/off button 224, the boost dialog box 220 is presented as shown. The boost dialog box 220 now shows four different options or selectable parameters for booting a news post, namely, until a post is viewed, until a specified number of impressions is reached, until expiry (a specified date or time) and boost rank. Each of these boost parameters is described further below. The user may be allowed to select the boost parameters in a suitable manner. In FIG. 3A, the user has selected the boost option of "until news post is viewed" 310 by selecting a radio button 312. The user's selection is represented by the filled in radio button 312. Boost "until news post is viewed" means that the news post will remain boosted until a user selects and views the expanded news post content.

Figure 3B:
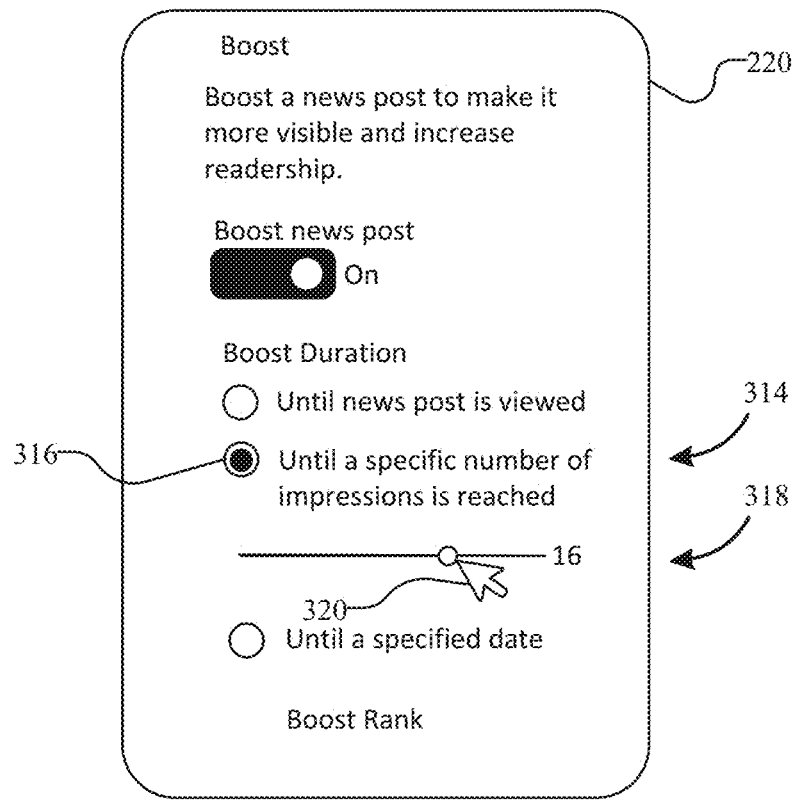
FIG. 3B illustrates another example boost dialog box which allows a user to set a boost parameter.

FIG. 3B represents another example of prompting a user to set a boost parameter for a news post after the user has selected to turn on boosting. In FIG. 3B, the user has selected the boost option of "until a specified number of impressions is reached" 314 as represented by the filled in button 316. Upon selection of the button 316, the user interface allows the user to select a number of impressions. In the illustrated example, the user interface provides a slide button 318 that allows the user to adjust the number of impressions by touching or dragging the slide button 318 with a cursor 320. Boost "until a specified number of impressions is reached" means that the post will remain boosted on a member's news feed until the specified number of impressions, meaning the number of times the news post is displayed to the member of the organization but not selected. The number of impressions of each user for each boosted news post may be collected and stored in the boost data 124 by the organization news site to provide basis for evaluating this parameter as described above with reference to FIG. 1.

Figure 3C:
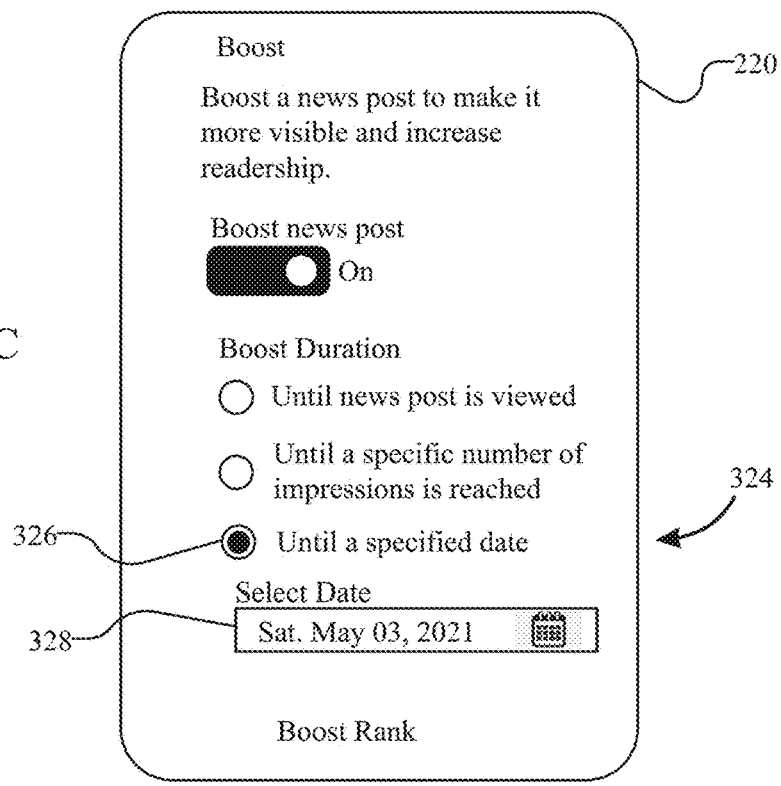
FIG. 3C illustrates another example boost dialog box which allows a user to set a boost parameter.

FIG. 3C represents another example of prompting a user to set a boost parameter for a news post after the user has selected to turn on boosting. In FIG. 3C, the user has selected the boost option of "until a specified date" 324 as represented by the filled in button 326. Upon selection of the button 326, the user interface allows the user a date or time for expiration of the boost. In the illustrated example, the user interface provides a date box 328 that allows the user to set a date. Boost "until a specified date" means that the post will remain boosted on a member's news feed until the specified date, or alternatively a specified number of days (not shown).

Figure 3D:
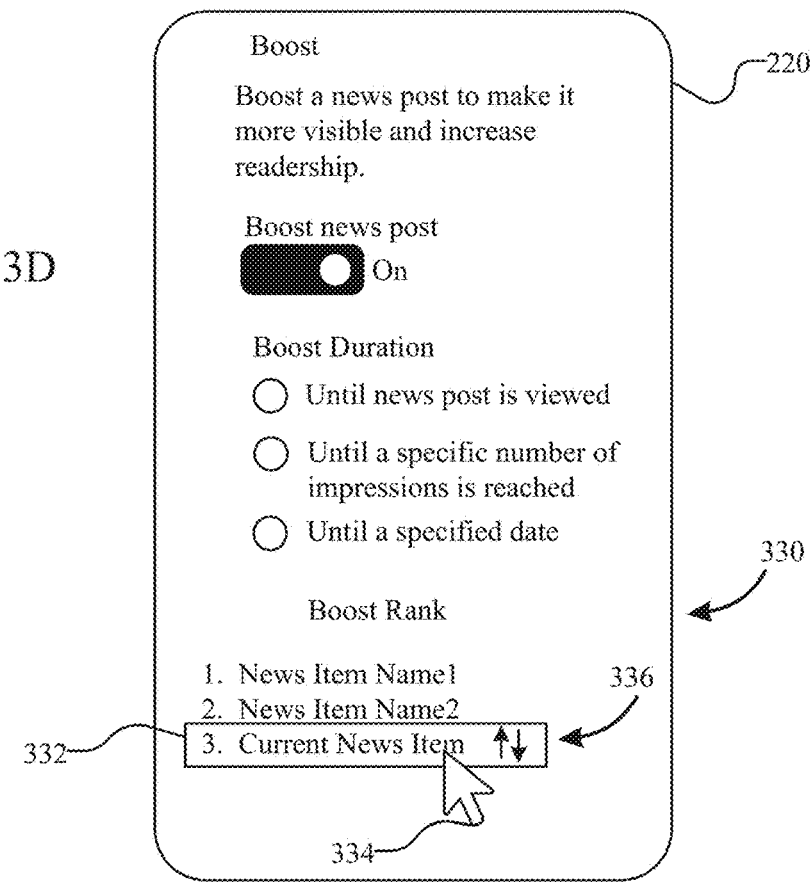
FIG. 3D illustrates another example boost dialog box which allows a user to set a boost parameter.

FIG. 3D represents another example of prompting a user to set a boost parameter for a news post. In this example, the boost rank parameter 330 is adjusted without a button as described in the previous examples. In contrast, the rank parameter 330 is presented as a list of boosted news posts, and the user is allowed to adjust the rank of the current news item. The user interface allows the user to rank the current news post relative to other ranked news posts that have been ranked previously. In the illustrated example, the user interface provides a list of previously ranked items along with the current news item 332 at the bottom of the list. The user interface then allows the user to select 334 the current news item 332 and change the rank of the selected news by moving the news item in the list relative to the other items. The user can move the news item in the list by dragging it up or down, or by using the up/down arrows 336 to change the rank. Boost rank means that the post will be boosted to the top of a member's news feed until another parameter, such as one of the parameters described above, dictates it will no longer be boosted.

Figure 4:
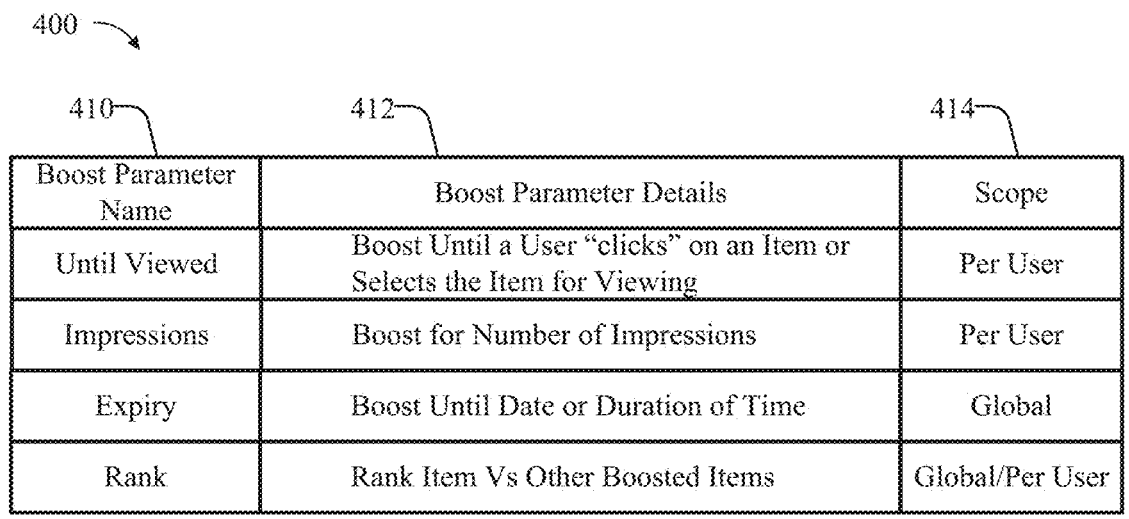
FIG. 4 illustrates a table 400 that summarizes the boost parameters described herein.

FIG. 4 illustrates a table 400 that provides a summary of the boost parameters described herein. Each boost parameter in table 400 includes a boost parameter name 410, boost parameter details 412 and a parameter scope 414. The "until viewed" boost parameter boosts a news post until a member clicks on an item or selects views it. The scope of this boost parameter is "per user" meaning that the boost impact is on a per user or per member basis. The organization news site must track each member of the organization to determine when the boost parameter expires for each member. The "impressions" boost parameter boosts a news post for a number of impressions before expiring, where impressions is the number of times the post is displayed to the member in the member's news feed. The scope of this parameter is also a per user basis since the number of impressions is unique for each member. The "expiry" boost parameter boosts a news post until a date or for a duration of time before expiring. The scope of this parameter is global since the time is not unique to each member. The "rank" boost parameter boosts a news post relative to other boosted items in a member's news feed. The scope of the rank parameter is both global and per user. The parameter rank set by the user has global affect, but the actual rank for the rank boosted post will vary on a per member basis since some boosted posts will no longer be active for some members as described herein. Each member may have other boosted posts expired based on whether the member has viewed the item or met the number of impressions. Since this is unique for each member, the news post that is ranked may appear different for each member.

In the following paragraphs, three scenarios will be described for boosting news posts. Each boost scenario results in a corresponding boost configuration that consists of one or more boost parameters set according to the needs of the scenario. The resulting rank of the boosting posts will then be described with reference to FIG. 5.

Scenario 1—Important Timely News (Covid Announcement). Kurt, an executive at the organization, wants to keep the organization up to date about the latest information that's going on for COVID-19. Kurt posts a news post named "Covid Announcement". Because this is an active organization, the organization news site typically has 5-10 news posts published on a daily basis. Kurt doesn't want this post to get buried with all the new content coming up through the week. After Kurt posts the news, Kurt clicks "Promote" and from there selects that he wants this news post to be 'boosted' for two weeks until a member has read the post. That means that with even through other news posts will be showing up on this site, for users who haven't seen Kurt's news post, they will see this more prominently on the organization's news site, and potentially other places that news is surfaced to them. Once a member has opened Kurt's news post, they will no longer see it prominently at the top of their feed and it will be shown back in it's original order agnostic of the item being boosted. The boost setting with their corresponding values could be represented as the following configuration for boosting the news post: Title: "Covid Announcement [Expiry: Mar. 29, 2021|Impressions: NA|BoostUntilSeen: True|Rank: 1].

Scenario 2—A Timebound News (5K Run). An organization 5K is an annual event that takes place on the first Wednesday in July every year. To promote participation, there's a news post on the company-wide organization news site. After the event has passed, the news post is less relevant so the news post will expire (orthogonal feature) the day after the event (Apr. 1, 2021). Because not everyone wants to run a 5K, Susie, a communication manager for the site chooses to show it in a promoted state to users for 5 impressions. This means that each member of the organization will see the news post boosted 5 times, and after that it will return it it's original order agnostic of ranking. Susie also sets this news post with a ranking of 3 compared to other boosted news posts. The boost setting with their corresponding values could be represented as the following configuration for boosting the news post: Title: "5K Run" [Expiry: Apr. 1, 2021|Impressions: 5|BoostUntilSeen: False|Rank: 3].

Scenario 3—Member specific (New Employee). After joining the organization, for new employees it's essential that they read the News Post 'ABC Electronic's 10 inclusive behaviors.' To this effect, Kathleen, has specified that on landing on the company homepage which is the organization news site landing page, users will indefinitely see this news post until they read it. When a user has read the news post anywhere, they will no longer see it showing up on the site or other surfaces. Kathleen also sets this news post with a ranking of 2 compared to other boosted news posts. The boost setting with their corresponding values could be represented as the following configuration for boosting the news post: Title: "New Employee" [Expiry: Never|Impressions: none|BoostUntilSeen: True Rank: 2]

Figure 5:
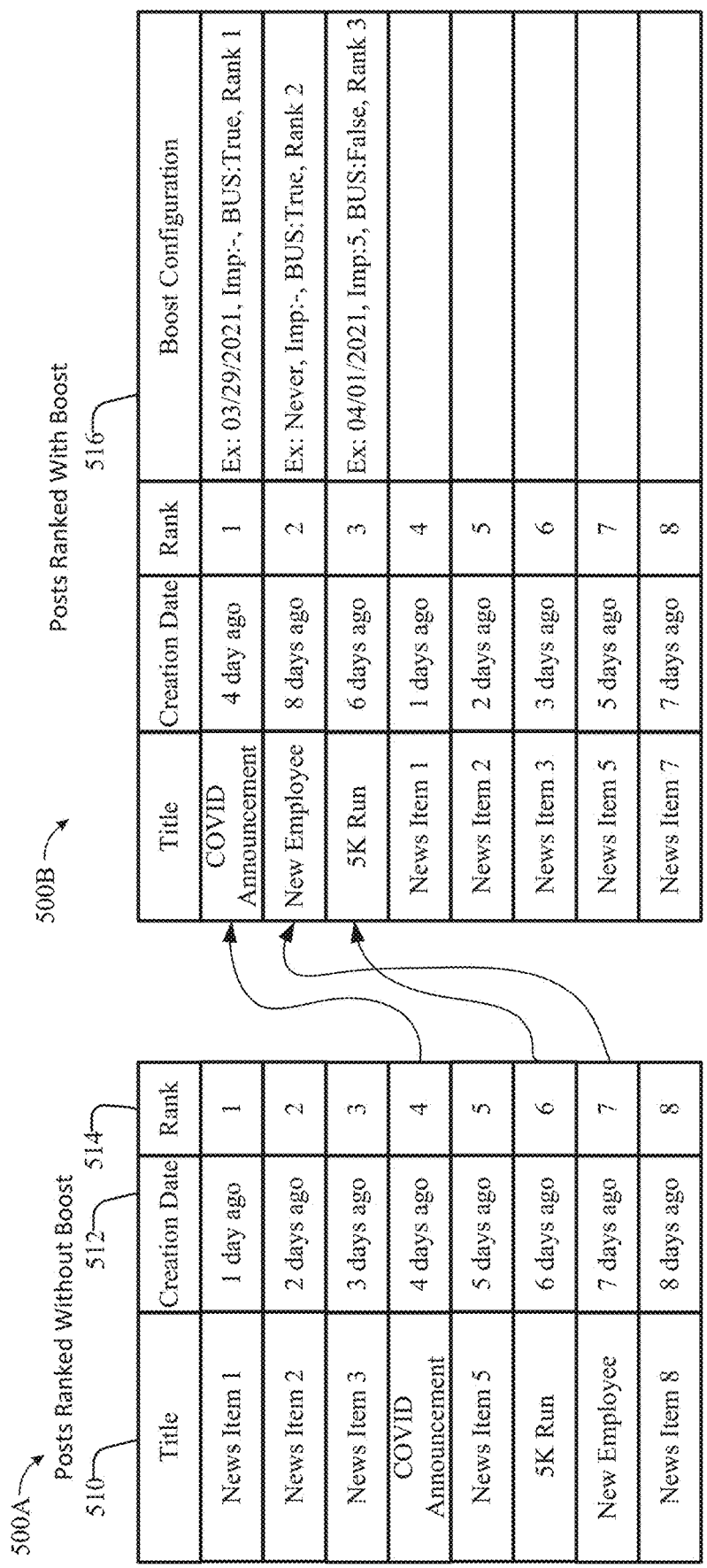
FIG. 5 illustrates examples of boosting news posts according to boost parameters set by a user.

More specifically, FIG. 5 illustrates tables 500A and 500B to show examples of boosting news posts which include the three scenarios described above. The boost information in the tables 500A, 500B include a post title 510, creation date 512 and a rank 514 for each news post. In addition, table 500B further includes a column for the boost configuration 516 for each news post. The left table 500A shows the rank of eight posts which includes the 3 posts described in the scenarios above. Without any boost to the news posts, the eight posts are ranked in the order of their creation date as shown in table 500A. In contrast, after the three posts have been boosted as described above, the same eight posts would be ranked as shown in table 500B. The post titled "Covid Announcement" is placed in the top position due to the rank set a 1, the highest rank. This post will be displayed to all users at the top of the news feed until the expiry date or until a member views the news post on a per user basis. The post titled "New Employee" is ranked 2 and will be displayed until seen by a member. The post titled "5K Run" is ranked 3 will be boosted until the date after the event or until 5 impressions. Other news posts without boosting parameters set (News Items 1, 2, 3, 5 and 7) are ranked in Table 500B according to their creation date.

In the illustrated examples, if a user does not select and set one of the boost parameters, then that parameter is not effective for that news post. If the user selects more than one boost parameter, then boosting of the corresponding news post will be effective until at least one of the parameters is met. In other examples (not shown), boosting of a news item could continue until all selected boost parameters are met. In the examples described herein, when one of the combined boost parameters is met, then the boost for the corresponding news post is cancelled. For example, if a boost configuration includes a boost until seen and a number of impressions, if the user views the news post, the boost will be cancelled regardless of the number of remaining impressions.

Figure 6A:
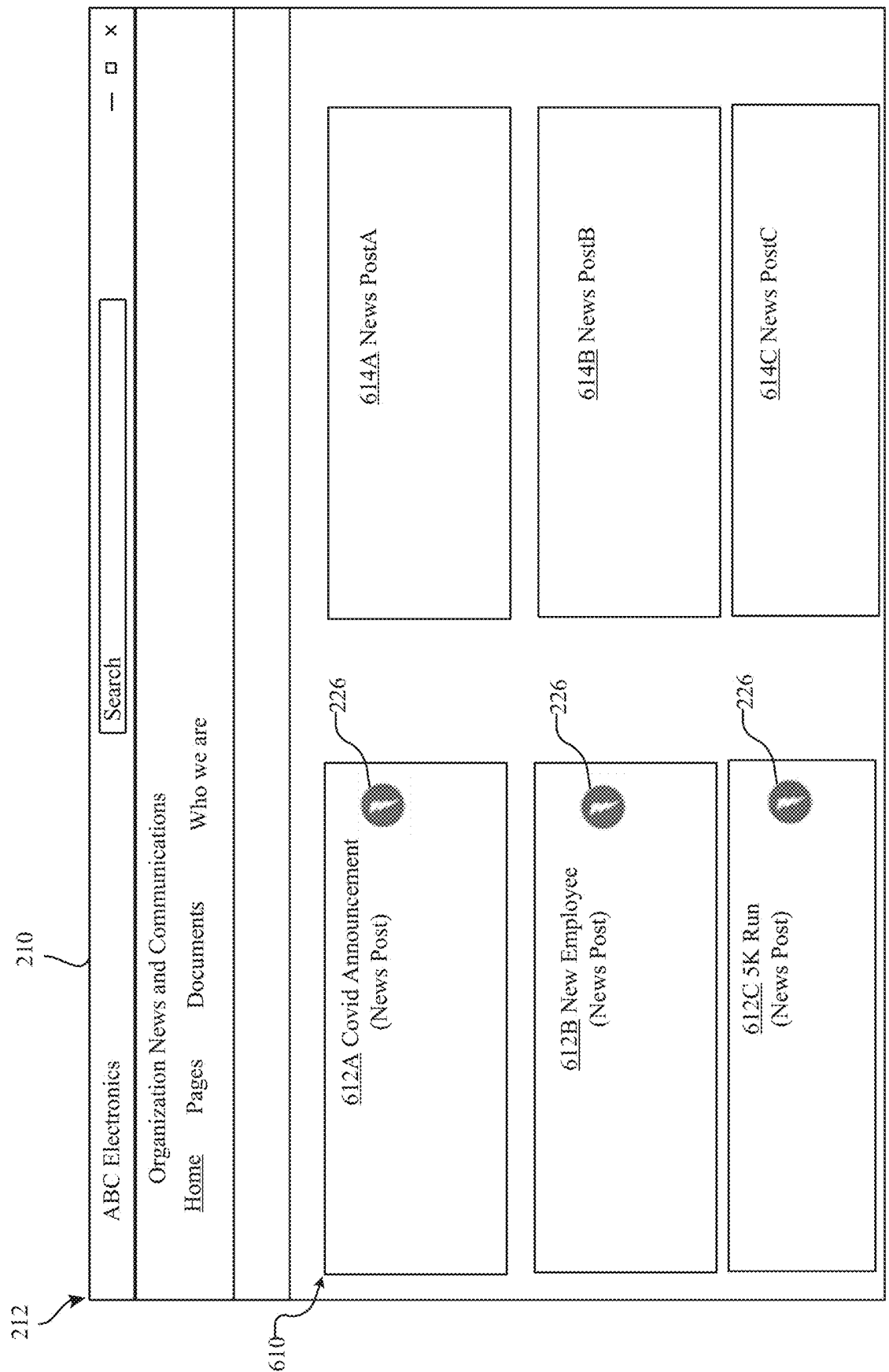
FIG. 6A illustrates an example of a boosted news feed using the example boost parameters shown in FIG. 5.

FIG. 6A illustrates an example of a boosted news feed using the example boost parameters shown in FIG. 5. In this example, a boosted news feed 610 is displayed to a member of the organization on a user interface 210 provided on an internet browser 212 similar to that described above with reference to FIG. 2. The example news feed 610 includes a number of boosted news posts 612A, 612B, 612C, collectively referred to as boosted news posts 612. In addition, the news feed 610 includes a number of non-boosted news posts 614A, 614B and 614C, collectively referred to as non-boosted news posts 614. The boosted news posts 612 correspond to the news posts described above with reference to FIG. 5. The boosted news posts 612 each have a boost indicator 226 to alert the user that the news post is boosted as described above with reference to FIG. 2B. The non-boosted news posts 614 do not have associated boost parameters and are ranked in the normal manner depending on the order the news items were created.

Figure 6B:
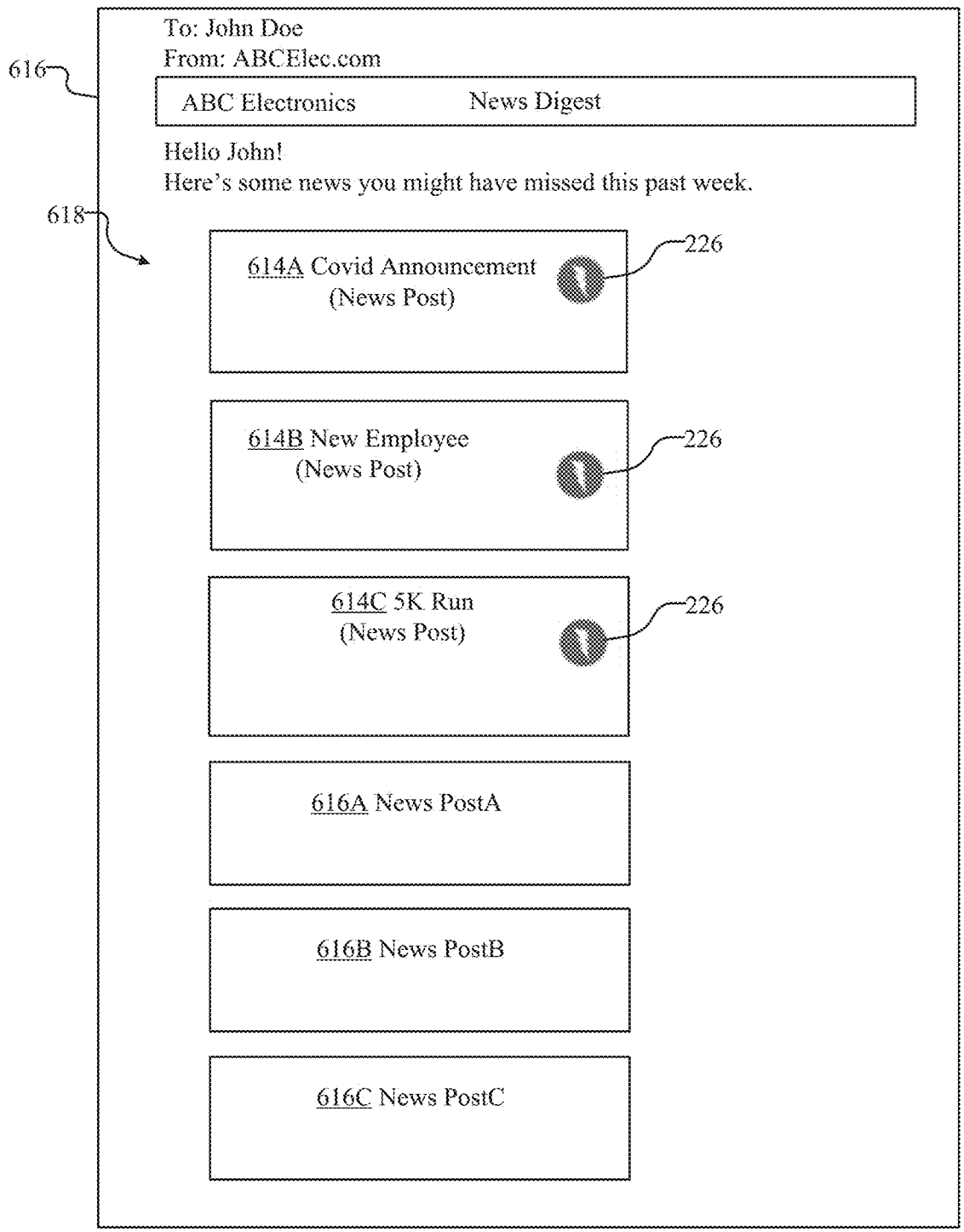
FIG. 6B illustrates an example of a boosted news feed in a news digest sent to a member of the organization.

FIG. 6B illustrates an example of a boosted news feed in a news digest sent to a member of the organization. In this example, a boosted news feed 610 is provided to a member of the organization as a news digest in an email 616. The example news feed 618 includes the same boosted news posts 612 and non-boosted news posts 614 described above with reference to FIG. 6A. The boosted news posts 612 each have a boost indicator 226 to alert the user that the news post is boosted as described above. The non-boosted news posts 614 do not have associated boost parameters and are ranked in the normal manner depending on the order the news items were created.

Figure 7:
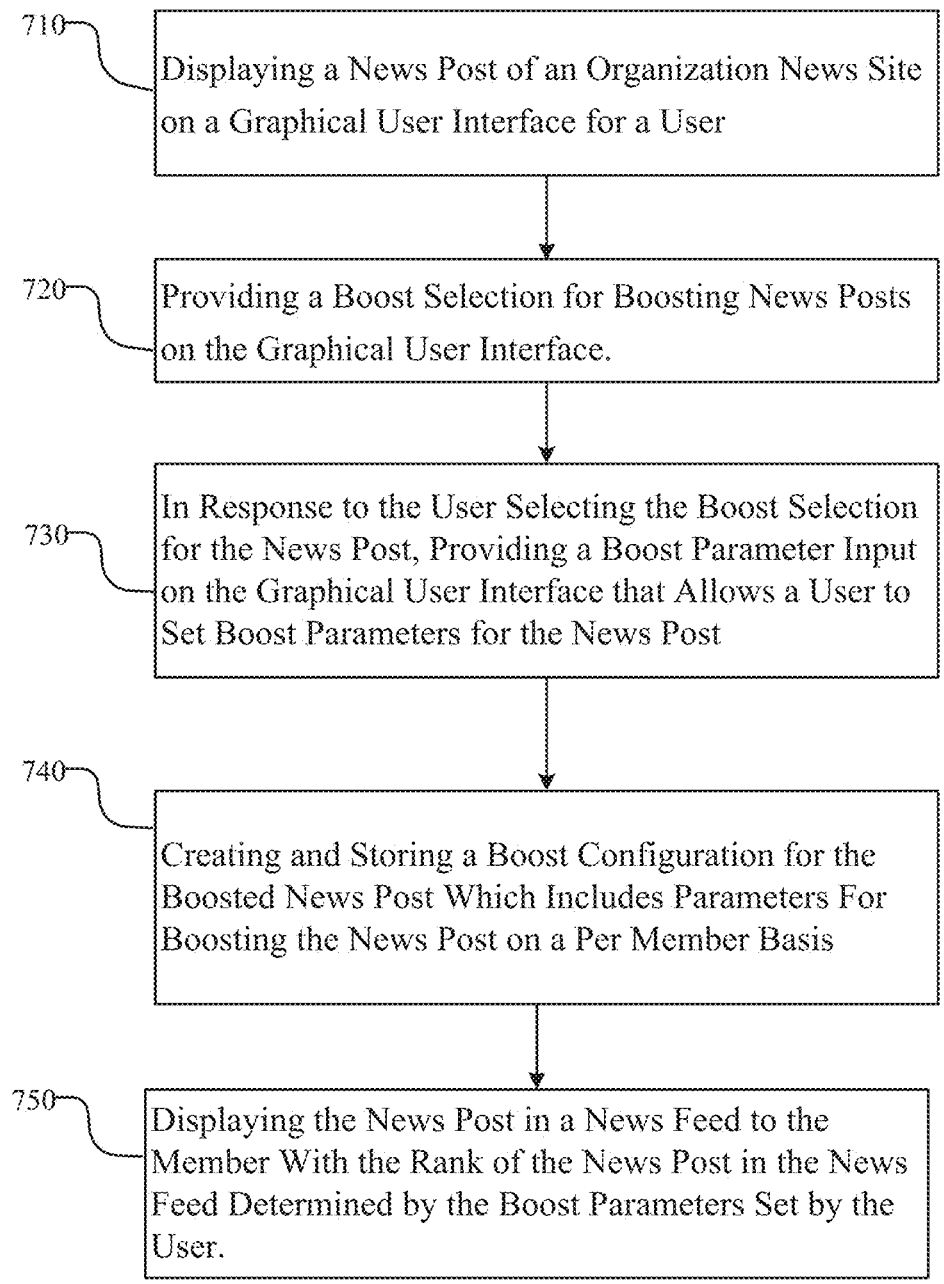
FIG. 7 illustrates an example of a method for providing an organization news site to a user with a boost module that boosts priority of news posts in a news feed.

FIG. 7 is an example implementation of a process 700 for boosting a news post in an organization news site. First, the process 700 displays a news post of an organization news site on a graphical user interface for a user (Step 710). The news post may be displayed on a user interface using a browser to access the organization news site. The user interface allows a user to select a news post for boosting. When the news post is selected, the news post may be opened or highlighted. Alternatively, the displayed news post may have been just created by the user. The process 700 provides a boost selection for boosting the news post in a members news feed (Step 720). The boost selection may be a "boost" button that a user may select as described above. Alternatively, the boost selection may be part of a "promote" menu option or other menu button.

The process 700 continues by providing a boost parameter input on the graphical user interface in response to the user selecting the boost selection for the news post (730). The boost selection allows a user to set boost parameters for the displayed news post. The boost parameters may include boosting until a news post is viewed, boosting for a number of impressions, boosting until a particular date, and setting a rank for the news post relative to other boosted items as described above. The process 700 then creates and stores a boost configuration for the boosted news post (step 740). The parameters for the boosting news post may be stored on a per member basis. The parameters may be stored in the organization news site as described above with reference to FIG. 1. The process 700 then displays the news post in a news feed to the member with the rank of the news post in the member's news feed determined by the boost parameters set by the user (750). The news feed may be part of a web page accessed by a browser, a news digest, or any other news feed that provides news items or news posts for a member of the organization.

Figure 8:
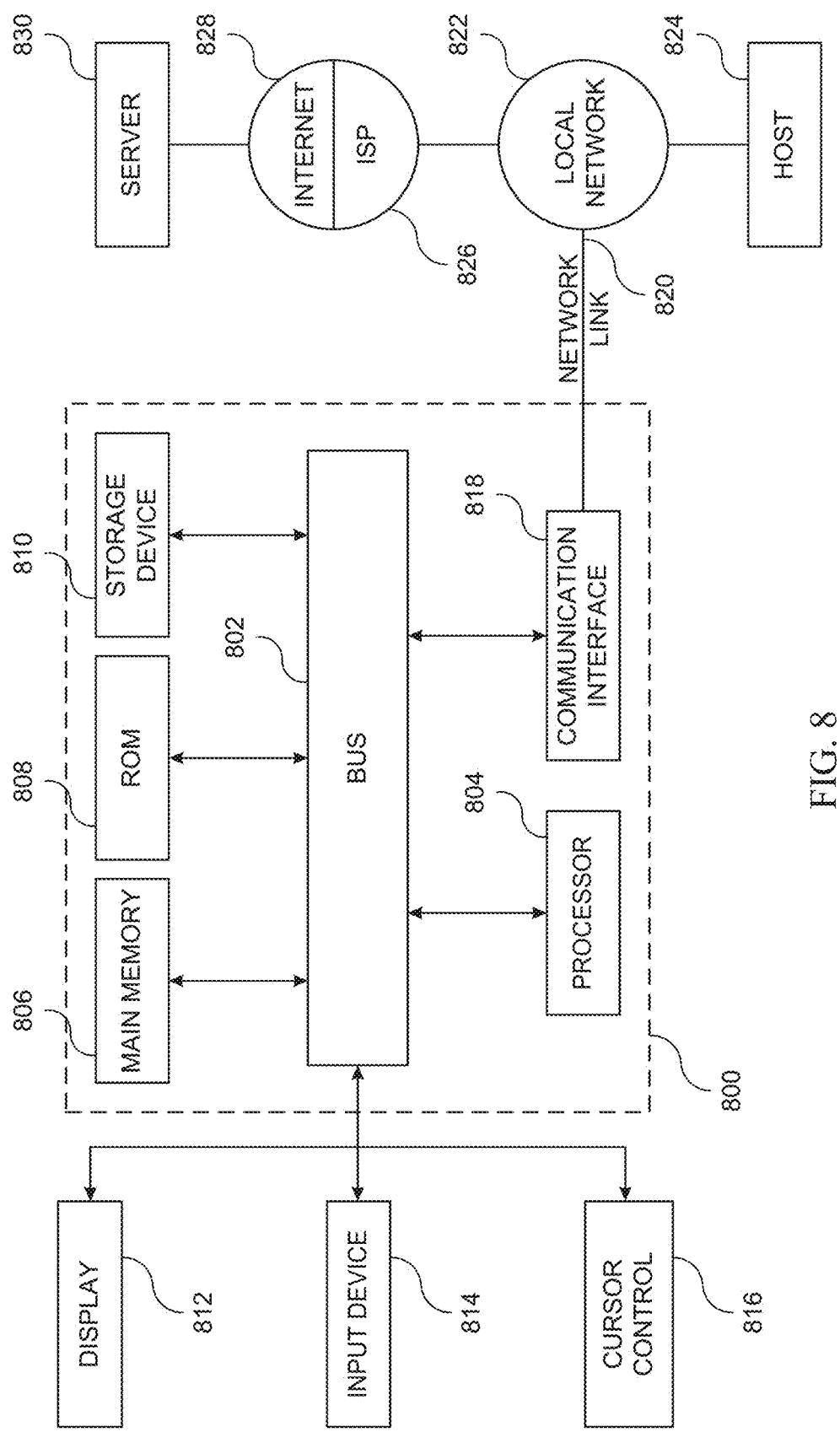
FIG. 8 is a block diagram showing an example computer system 800 upon which various implementations of this disclosure may be implemented.

FIG. 8 is a block diagram showing an example computer system 800 upon which various implementations of this disclosure may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804.

The computer system 800 may further include a read only memory (ROM) 808 or other static storage device coupled to the bus 802 for storing static information and instructions for the processor 804. A storage device 810, such as a flash or other non-volatile memory may be coupled to the bus 802 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include physical structure, or virtual implementation, or both, providing user input modes or options, for controlling, for example, a cursor through cursor control 816, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program or an internet web page.

As used herein, "computer-readable" medium" refers to a device, such as storage 438, able to temporarily or permanently store instructions and data that cause computer system or machine to operate in a specific fashion. The term "computer-readable medium," as used herein, does not encompass transitory electrical or electromagnetic signals per se (such as on a carrier wave propagating through a medium); the term "computer-readable medium" may therefore be considered tangible and non-transitory. Non-limiting examples of a non-transitory, tangible computer-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "computer-readable medium" applies to a single medium, or combination of multiple media, used to store instructions for execution by a computer system, such as mobile device, such that the instructions, when executed by one or more processors, cause the system to perform and one or more of the features described herein. Accordingly, a "computer-readable medium" may refer to a single storage device, as well as "cloud-based" storage systems or storage networks that include multiple storage apparatus or devices.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device for boosting news posts in an organization news site comprising:
    a processor; and
    a memory in communication with the processor, the memory comprising executable instructions that, when executed by the processor, cause the processor to control the device to perform functions of:
        displaying one or more news posts of the organization news site on a graphical user interface for a user;
        in response to the user selecting one news post, providing a boost parameter input on the graphical user interface that allows the user to set at least one boost parameter applicable to just the one news post:
        displaying on the graphical user interface the selected one news post in a list with other news posts;
        allowing the user to move the one news post up or down in the list to change a display priority of the one news post up or down relative to the other news posts; and
        displaying the one news post with the display priority in a ranked news feed of an organization member with a rank of the one news post in the news feed determined by the at least one boost parameter set by the user.

2. The device of claim 1, wherein the at least one boost parameter sets the display priority for the one news post relative to other news posts in news feeds of all members of the organization news site, and the at least one boost parameter includes a boost duration for the displaying the one news post in the ranked news feed until the boost duration for the display priority expires.

3. The device of claim 2, wherein the boost duration provides boosting the display priority of the news post in an organization member's news feed for a specified number of impressions of the organization member on a per organization member basis before expiring.

4. The device of claim 2, wherein the boost duration provides boosting the display priority of the news post until the news post is viewed by the organization member before expiring.

5. The device of claim 2, wherein the boost duration provides boosting the display priority of the news post until a particular date before expiring.

6. The device of claim 1, further comprising creating and storing a boost configuration for the boosted news post which includes parameters for boosting the news post on a per organization member basis.

7. The device of claim 1, wherein the at least one boost parameter boosts the news post by ranking the news post relative to other boosted news items in the news feed.

8. The device of claim 1, wherein the ranking has a global scope that is adjusted on a per member basis.

9. The device of claim 1, wherein the news post displayed in the news feed of the organization member includes an indication that the news post was boosted.

10. The device of claim 1, wherein the news feed of the organization member is a news digest sent to the member with the rank of the news post in the news feed determined by the at least one boost parameters set by the user.

11. The device of claim 1, wherein the executable instructions are part of a boost module in an organization news site residing on a server.

12. A method of operating a device, comprising:
    providing a graphical user interface for a user on a display;
    displaying one or more news posts of an organization news site on the graphical user interface for the user;
    in response to the user selecting one news post, providing a boost parameter input on the graphical user interface that allows the user to set at least one boost parameter applicable to just the one news post, wherein:
        the at least one boost parameter sets a display priority for the one news post relative to other news posts in news feeds of all members of the organization news site, and
        the at least one boost parameter further includes a boost duration for the boost to expire;
    displaying on the graphical user interface the selected one news post in a list with other news items;
    allowing the user to move the one news item up or down in the list to change the display priority of the one news item up or down relative to the other news items; and
    displaying the one news post with the display priority until the boost duration for the display priority expires in a ranked news feed of an organization member with a rank of the one news post in the news feed determined by the at least one boost parameter set by the user.

13. The method of claim 12, further comprising creating and storing a boost configuration for the boosted news post which includes parameters for boosting the news post on a per organization member basis.

14. The method of claim 12, wherein the at least one boost parameter boosts the news post in an organization member's news feed for a number of impressions of the organization member on a per organization member basis until the boost duration for the display priority expires.

15. The method of claim 12, wherein the news post displayed in the news feed of the organization member includes an indication that the news post was boosted.

16. The method of claim 12, wherein the at least one boost parameter boosts the news post by ranking the news post relative to other boosted news items in the news feed and the ranking has a global scope that is adjusted on a per member basis.

17. The method of claim 12, wherein the method is performed as part of a boost module in an organization news site residing on a server.

18. A method of operating a device, comprising:
providing a graphical user interface for a user on a display;
displaying one or more news posts of an organization news site on the graphical user interface for the user;
providing a boost selection for promoting news posts on the graphical user interface;
in response to the user selecting the boost selection for the news post, providing a boost parameter input on the graphical user interface that allows the user to set a plurality of boost parameters applicable to just the one news post, wherein:
the plurality of boost parameters set a display priority for the news post in news feeds of all members relative to other news posts of an organization news site, and
at least one of the plurality of boost parameters further include a boost duration for the boost to expire;
creating and storing a boost configuration for the boosted news post which includes parameters for boosting the news post on a per organization member basis;
displaying on the graphical user interface the selected one news post in a list with other news items;
allowing the user to move the one news item up or down in the list to change the display priority of the one news item up or down relative to the other news items;
displaying the one news post with the display priority until the boost duration for the display priority expires in a ranked news feed of an organization member with a rank of the one news post in the news feed determined by the at least one boost parameter of the plurality of boost parameters set by the user;
wherein the plurality of boost parameters includes boosting the news post in the organization member's news feed for a number of impressions of the organization member on a per organization member basis; and
wherein the news post displayed in the news feed of the organization member includes an indication that the news post was boosted.

\* \* \* \* \*